United States Patent
Courtney et al.

[11] Patent Number: 5,876,046
[45] Date of Patent: Mar. 2, 1999

[54] CHILD STROLLER AND INFANT CARRIER SYSTEM

[76] Inventors: Steve Courtney, 725 Sunnymead Pl., Troy, Ohio 45373; David J. Stroud, 360 Mapletrace Trail, Dayton, Ohio 45458; Jerry Drobinski, 411 Mount Penn Rd., Reding, Pa. 19607

[21] Appl. No.: 556,184

[22] Filed: Nov. 9, 1995

[51] Int. Cl.⁶ ................................................. B62B 7/06
[52] U.S. Cl. ............................ 280/30; 280/642; 280/643
[58] Field of Search ........................... 280/30, 639, 638, 280/642, 643, 644, 648, 651, 657, 658, 47.24, 47.26, 47.34, 47.38, 47.39, 47.4, 47.41

[56] References Cited

U.S. PATENT DOCUMENTS

| | | | |
|---|---|---|---|
| D. 348,637 | 7/1994 | Globerman et al. | D12/129 |
| D. 357,439 | 4/1995 | Haut et al. | D12/129 |
| D. 359,936 | 7/1995 | Takahashi et al. | D12/129 |
| D. 362,832 | 10/1995 | Haut et al. | D12/129 |
| D. 363,260 | 10/1995 | Haung | D12/129 |
| 2,476,727 | 7/1949 | Harman . | |
| 3,075,783 | 1/1963 | Flam . | |
| 3,504,926 | 4/1970 | Glaser . | |
| 3,550,998 | 12/1970 | Boudreau et al. . | |
| 3,659,865 | 5/1972 | Nothacker | 280/7.1 |
| 3,873,117 | 3/1975 | Perego | 280/36 B |
| 4,108,468 | 8/1978 | Orlanski | 280/648 |
| 4,191,397 | 3/1980 | Kassai | 280/647 |
| 4,591,176 | 5/1986 | Kassai | 280/47.36 |
| 4,664,396 | 5/1987 | Pietrafesa | 280/30 |
| 4,819,958 | 4/1989 | Perego | 280/644 |
| 4,847,945 | 7/1989 | Schwartz et al. | 16/30 |
| 4,861,105 | 8/1989 | Merten et al. | 297/250 |
| 4,913,452 | 4/1990 | Zun | 280/47.41 |
| 4,930,697 | 6/1990 | Takahashi et al. | 224/275 |
| 5,056,865 | 10/1991 | Sedlack | 297/250 |
| 5,087,066 | 2/1992 | Mong-Hsing | 280/644 |
| 5,144,717 | 9/1992 | Siesholtz et al. | 16/47 |
| 5,201,535 | 4/1993 | Kato et al. | 280/30 |
| 5,203,577 | 4/1993 | Kato et al. | 280/30 |
| 5,244,228 | 9/1993 | Chiu | 280/642 |
| 5,427,402 | 6/1995 | Huang | 280/642 |
| 5,447,323 | 9/1995 | Huang | 280/642 |
| 5,454,584 | 10/1995 | Haut et al. | 280/642 |
| 5,460,398 | 10/1995 | Huang | 280/642 |

Primary Examiner—Richard M. Camby

[57] ABSTRACT

A child stroller and infant carrier system comprising a stroller having a frame. Generally parallel upstanding pylons are secured to the lower tubes adjacent to their upper ends with resilient locking fingers movable outwardoy from the pylon. An infant carrier with an upstanding front, back and sides is fabricated of a rigid material with a pivotable handle in an inverted U-shaped configuration extending upwardly from intermediate points on the sides thereof. The carrier has an aperture on each side positionable to releasably couple with the pylons to thereby selectively join the carrier to the stroller.

3 Claims, 4 Drawing Sheets

CHILD STROLLER AND INFANT CARRIER SYSTEM

BACKGROUND OF THE INVENTION

1. Field of the Invention

The present invention relates to a child stroller and infant carrier system and more particularly pertains to releasably coupling an infant carrier to a child stroller for use of such child stroller and infant carrier independently or together as a system.

2. Description of the Prior Art

The use of child strollers, infant carriers and associated child care products of various designs and configurations is known in the prior art. More specifically, child strollers, infant carriers and associated child care products of various designs and configurations heretofore devised and utilized for the purpose of coupling child care products together in systems configurations through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,191,397 to Kassai discloses a baby carriage. U.S. Pat. No. 4,591,176 to Kassai discloses a locking mechanism for push-rod of baby carriage. U.S. Pat. No. 4,819,958 to Perego discloses a child's folding pushchair with safety device for locking the pushchair in the opened position. U.S. Pat. No. 4,930,697 to Takahashi et al. discloses a shopping basket for use with a stroller. U.S. Pat. No. 5,087,066 to Mong-Hsing discloses a foldable baby stroller. U.S. Pat. No. 5,201,535 to Kato et al. discloses a folding stroller with detachable seat. U.S. Pat. No. 5,203,577 to Kato et al. discloses a mechanism for holding seating unit of baby carriage engagement. U.S. Pat. No. 5,244,228 to Chiu discloses a collapsible device for a baby carriage. U.S. Pat. No. 5,427,402 to Huang discloses a foldable stroller. U.S. Pat. No. 5,447,323 to Huang discloses a positioning arrangement for a backrest of a stroller. U.S. Pat. No. 5,454,584 to Haut et al. discloses a collapsible stroller. U.S. Pat. No. 5,460,398 to Huang discloses a foldable stroller. U.S. Pat. No. Des. 348,637 to Globerman et al. discloses a baby stroller. U.S. Pat. No. Des. 359,936 to Takahashi et al. discloses a baby stroller. U.S. Pat. No. Des. 357,439 to Haut et al. discloses a stroller. U.S. Pat. No. Des. 362,832 to Haut et al. discloses a stroller. U.S. Pat. No. Des. 363,260 to Huang discloses a stroller. U.S. Pat. No. 4,847,945 to Schwartz et al. discloses a dismantable wheel attachment mechanism with swivel joint protector. U.S. Pat. No. 4,861,105 to Merten et al. discloses an infant car seat mountable on a grocery cart. U.S. Pat. No. 4,913,452 to Zun discloses a caster-supporting device for a baby stroller. U.S. Pat. No. 5,056,865 to Sedlack discloses a shopping cart locking means. U.S. Pat. No. 5,144,717 to Siesholtz et al. discloses a double wheel caster for being rotatably mounted on a leg of a transport carrier. U.S. Pat. No. 2,476,727 to Hardman discloses a folding stroller. U.S. Pat. No. 3,075,783 to Flam discloses a collapsible stroller frame linkage. U.S. Pat. No. 3,504,926 to Glaser discloses a baby carriage. U.S. Pat. No. 3,550,998 to Boudreau et al. discloses a foldable carriage and infant seat. U.S. Pat. No. 3,659,865 to Nothacker discloses a safety seat for children. U.S. Pat. No. 3,873,117 to Perego discloses a foldable baby carriage construction. U.S. Pat. No. 4,108,468 to Orlanski discloses a sleeper adapter for a collapsible baby stroller.

In this respect, the child stroller and infant carrier system according to the present invention substantially departs from the conventional concepts and designs of the prior art, and in so doing provides an apparatus primarily developed for the purpose of releasably coupling an infant carrier to a child stroller for use of such child stroller and infant carrier independently or together as a system.

Therefore, it can be appreciated that there exists a continuing need for new and improved child stroller and infant carrier system which can be used for releasably coupling an infant carrier to a child stroller for use of such child stroller and infant carrier independently or together as a system. In this regard, the present invention substantially fulfills this need.

SUMMARY OF THE INVENTION

In view of the foregoing disadvantages inherent in the known types of child strollers, infant carriers and associated child care products of various designs and configurations now present in the prior art, the present invention provides an improved child stroller and infant carrier system. As such, the general purpose of the present invention, which will be described subsequently in greater detail, is to provide a new and improved child stroller and infant carrier system apparatus and method which has all the advantages of the prior art and none of the disadvantages.

To attain this, the present invention essentially comprises a new and improved child stroller and infant carrier system with releasable components therebetween comprising, in combination, a stroller having a frame. The frame is formed of two parallel main diagonal supports with each support being formed of an upper tube and a parallel lower tube. The upper and lower tubes are pivotally coupled together with hinges and releasable locks at the lower ends of the upper tubes and the upper ends of the lower tubes. Each lower tube has at its lower end a wheel rotatable about vertical and horizontal axes. A pair of generally vertical tubes are each coupled at its upper end to an intermediate point of an upper tube. Each vertical tube has a rotatable wheel with a brake at its lower end. A pair of generally horizontal tubes each have a forward end and a rearward end with an intermediate point pivotally coupled to an intermediate point of the vertical tube with a forward point of the horizontal tube pivotally coupled to an intermediate point of the lower tube. Generally parallel upstanding pylons are secured to the lower tubes adjacent to their upper ends with resilient locking fingers movable outwardly from the pylon. An infant carrier with an upstanding front, back and sides is fabricated of a rigid material with a pivotable handle in an inverted U-shaped configuration extending upwardly from intermediate points on the sides thereof. The carrier has an aperture on each side positionable to releasably couple with the pylons to thereby selectively join the carrier to the stroller.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child stroller and infant carrier system which has all the advantages of the prior art and none of the disadvantages.

It is another object of the present invention to provide a new and improved child stroller and infant carrier system which may be easily and efficiently manufactured and marketed.

It is a further object of the present invention to provide a new and improved child stroller and infant carrier system which is of a durable and reliable construction.

An even further object of the present invention is to provide a new and improved child stroller and infant carrier system which is susceptible of a low cost of manufacture with regard to both materials and labor, and which accordingly is then susceptible of low prices of sale to the consuming public, thereby making such child strollers, infant carriers and associated child care products of various designs and configurations economically available to the buying public.

Still yet another object of the present invention is to provide a new and improved child stroller and infant carrier system which provides in the apparatuses and methods of the prior art some of the advantages thereof, while simultaneously overcoming some of the disadvantages normally associated therewith.

Still another object of the present invention is to releasably coupling an infant carrier to a child stroller for use of such child stroller and infant carrier independently or together as a system.

Lastly, it is an object of the present invention to provide a new and improved child stroller and infant carrier system comprising a stroller having a frame. Generally parallel upstanding pylons are secured to the lower tubes adjacent to their upper ends with resilient locking fingers movable outwardly from the pylon. An infant carrier with an upstanding front, back and sides is fabricated of a rigid material with a pivotable handle in an inverted U-shaped configuration extending upwardly from intermediate points on the sides thereof. The carrier has an aperture on each side positionable to releasably couple with the pylons to thereby selectively join the carrier to the stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 2:
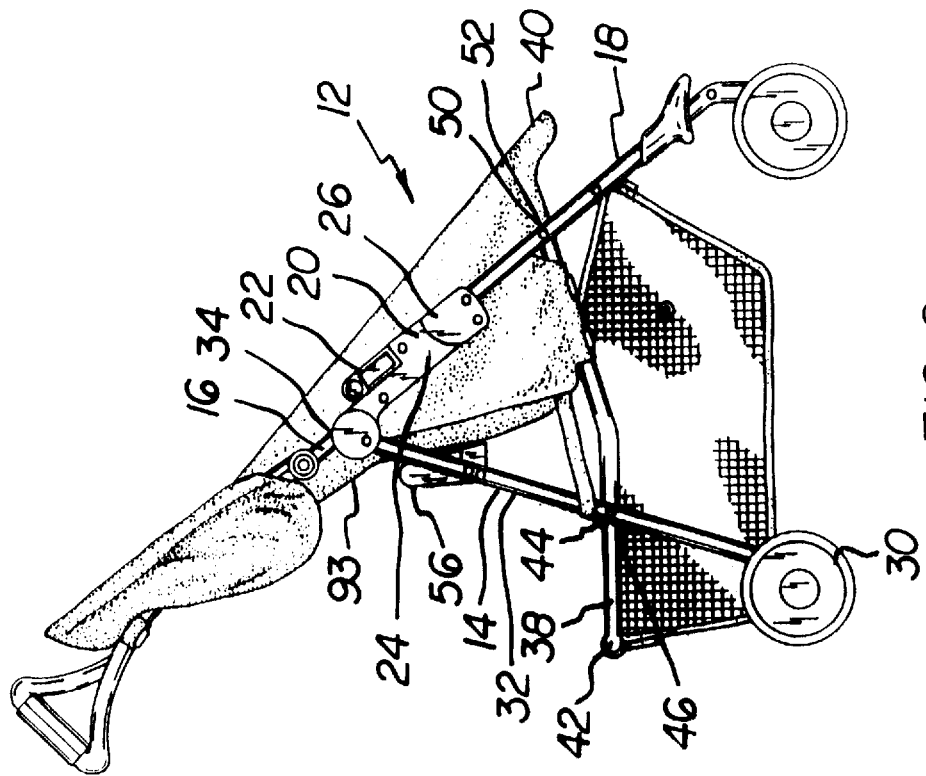
FIG. 2 is a side elevational view of the device shown in FIG. 1.
Figure 1:
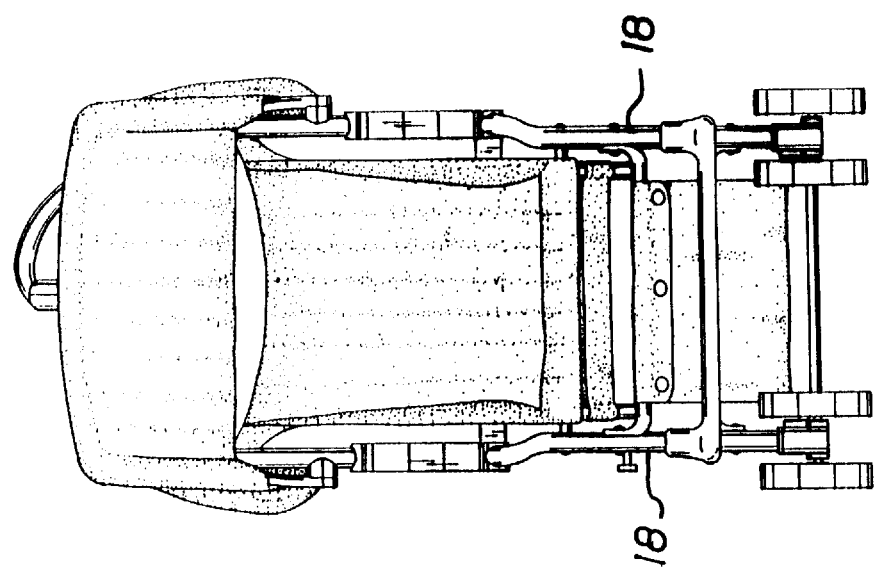
FIG. 1 is a front elevational view of the preferred embodiment of the child stroller and infant carrier system constructed in accordance with the principles of the present invention.
Figure 4:
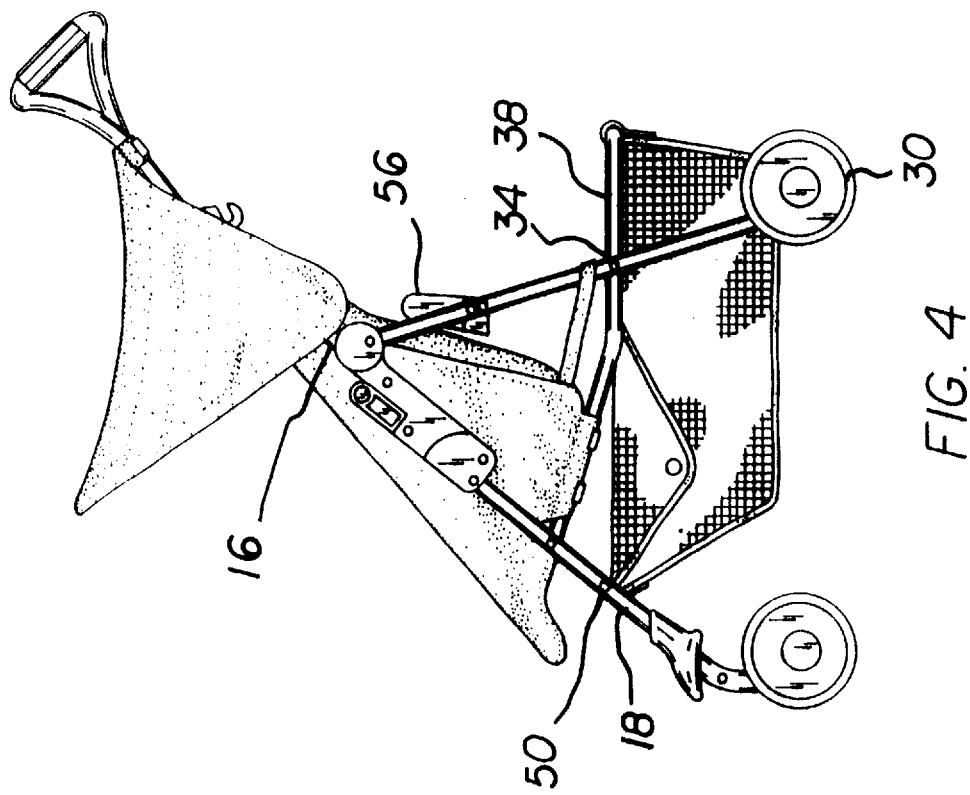
FIG. 4 is a side elevational view similar to FIG. 2 but taken from the opposite side and with the canopy extended.
Figure 3:
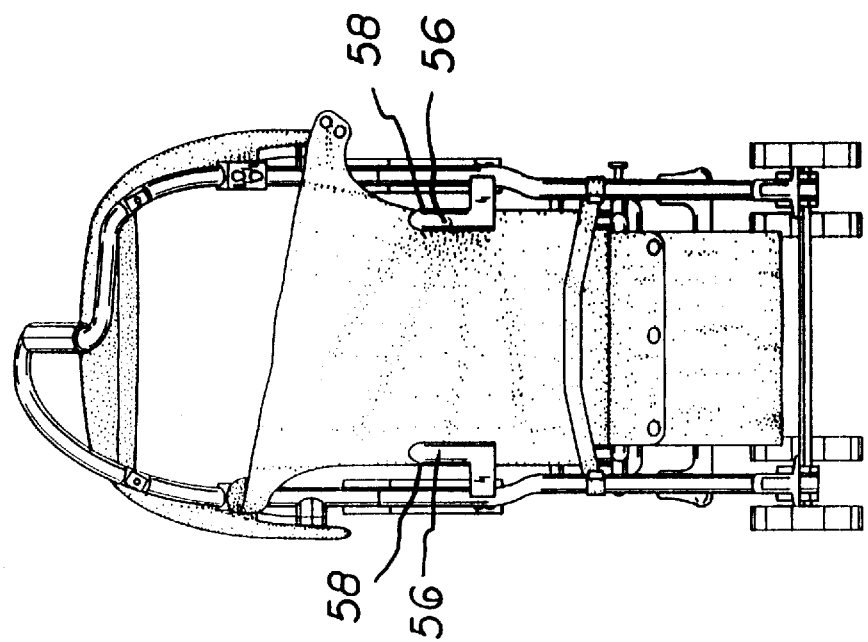
FIG. 3 is a rear elevational view of the device shown in FIG. 1.
Figure 6:
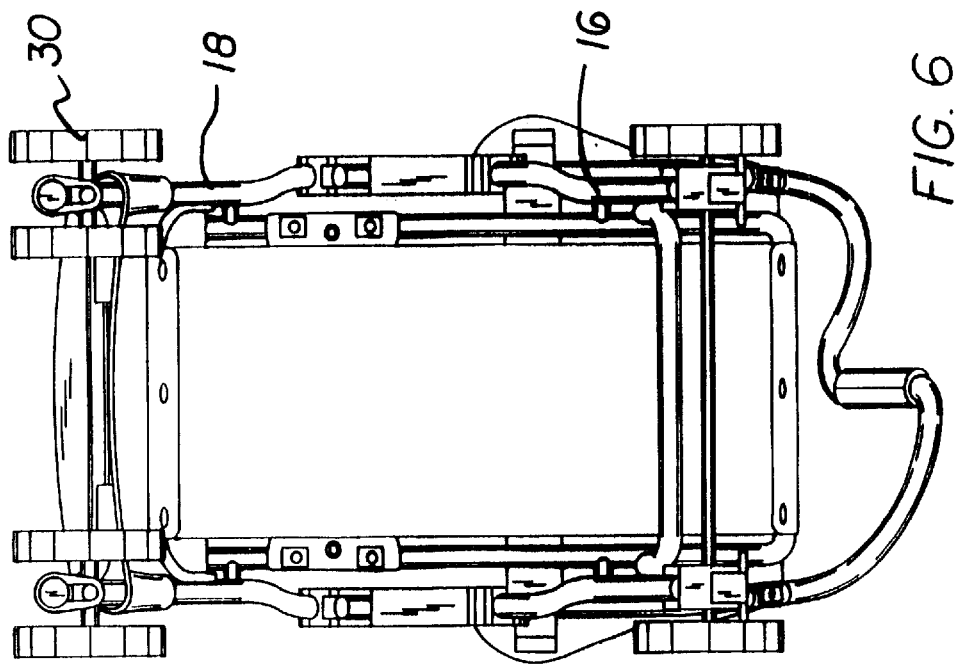
FIGS. 5 and 6 are top and bottom plan views of the infant carrier adapted to be coupled to the stroller of the prior Figures.
Figure 5:
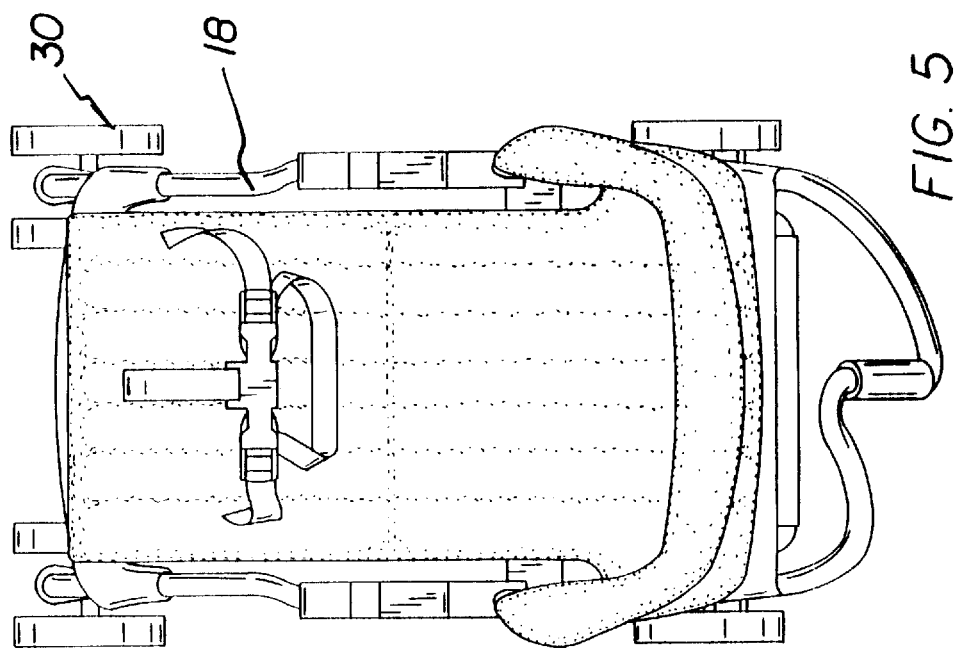
Figure 7:
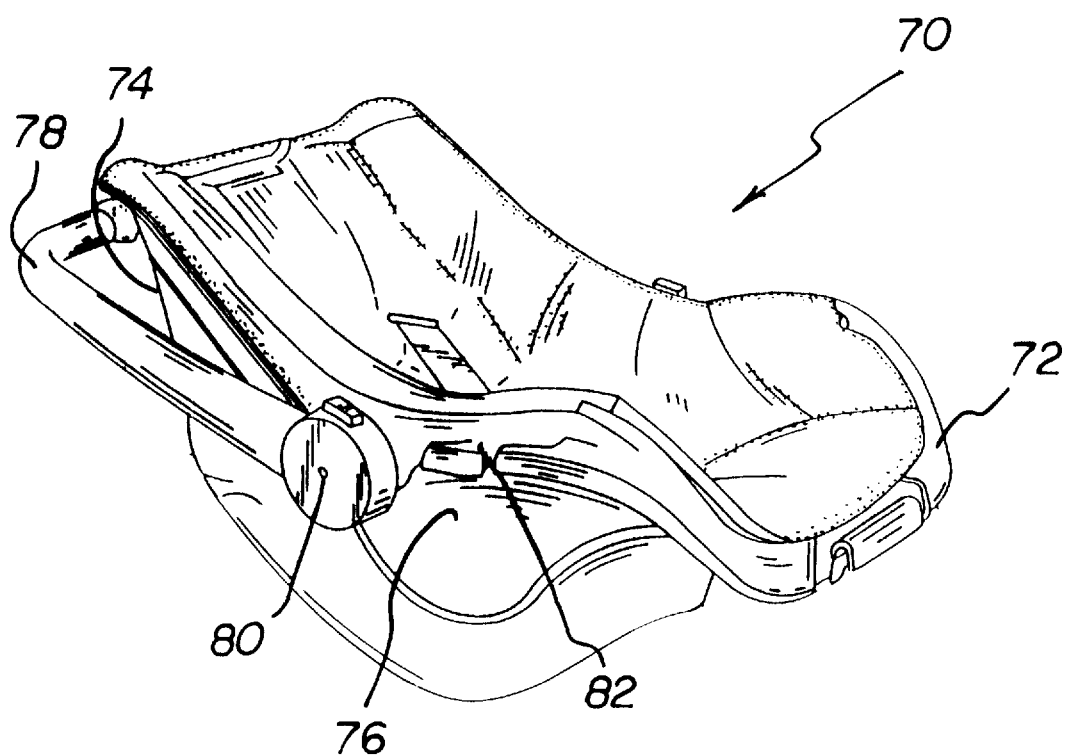
FIG. 7 is a perspective illustration of the child stroller and infant carrier system shown in the prior figures.

With reference now to the drawings, and in particular to FIG. 1 thereof, a new and improved child stroller and infant carrier system embodying the principles and concepts of the present invention and generally designated by the reference numeral 10 will be described.

The present invention, the new and improved child stroller and infant carrier system, is comprised of a plurality of components. Such components in their broadest context include a stroller, an infant carrier and coupling components therebetween. Such components are individually configured and correlated with respect to each other so as to attain the desired objective.

One of the two major components of the system 10 of the present invention is a stroller 12. The stroller is constructed to have a frame 14. The frame is formed to include two parallel main diagonal supports with each being formed of an upper tube 16 and a parallel lower tube 18. The upper and lower tubes are pivotally coupled together through hinges 20. In addition, releasable locks 22 allow for the bending of the tubes about the pivot point or locking them in a generally fixed orientation with respect to each other parallel but offset. The lower ends 24 of the upper tubes and the upper ends 26 of the lower tubes constitute the location for the pivoting and the locking.

Each lower tube has at its lower extent a wheel 30 rotatable about vertical and horizontal axes. These constitute casters. In addition, a pair of generally vertical tubes 32 are also provided. Each is coupled at its upper end to an intermediate point 34 of the upper tube. Each vertical tube has a rotatable wheel with a releasable brake 36 at its lower end. Also as part of the frame is a pair of generally horizontal tubes 38. Each such horizontal tube has a forward end 40 and a rearward end 42 with an intermediate point 44. Pivotally coupled to the intermediate point of the horizontal tube is an intermediate point 46 of the vertical tube. In addition, there is a forward point 48 of the horizontal tube which is pivotally coupled by a pin 50 to an intermediate point 52 of the lower tube.

Coupled as part of the frame structure are generally parallel upstanding pylons 56. Such pylons are laterally spaced from each other. They are secured to the lower tube adjacent to their upper ends. Resilient locking fingers 58 are movable outwardly from the pylons to ensure retention of a carrier onto the frame.

The last component of the system 10 is an infant carrier 70. Such infant carrier is formed with an upstanding front 72, back 74, and sides 76. Such carrier is fabricated of a rigid material, preferably plastic. the carrier is also formed with a pivotable handle 78. The pivotable handle is in an inverted U-shaped configuration. It extends upwardly from intermediate point 80 on the sides of the carrier.

The carrier is formed with an aperture 82 on each side. Such apertures are positionable to releasably couple by a sliding motion with the pylons of the frame. In this manner, the carrier may be selectively joint and separated from the stroller.

As to the manner of usage and operation of the present invention, the same should be apparent from the above description. Accordingly, no further discussion relating to the manner of usage and operation will be provided.

Further details of the carrier can be found in U.S. Pat. No. 4,943,113, the subject matter of which is incorporated herein by reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved child stroller and infant carrier system with releasable components therebetween comprising, in combination:

a stroller having a frame, the frame being formed of two parallel main diagonal supports with each support being formed of an upper tube and a parallel lower tube, the upper and lower tubes being pivotally coupled together with hinges and releasable locks at the lower ends of the upper tubes and the upper ends of the lower tubes, each lower tube having at its lower end a wheel rotatable about vertical and horizontal axes, a pair of generally vertical tubes each coupled at its upper end to an intermediate point of an upper tube, each vertical tube having a rotatable wheel with a brake at its lower end, a pair of generally horizontal tubes each having a forward end and a rearward end with an intermediate point pivotally coupled to an intermediate point of the vertical tube with a forward point of the horizontal tube pivotally coupled to an intermediate point of the lower tube;

generally parallel upstanding pylons secured to the lower tubes adjacent to their upper ends with resilient locking fingers movably outwardly from the pylon;

an infant carrier with an upstanding front, back and sides fabricated of a rigid material with a pivotable handle in an inverted u-shaped configuration extending upwardly from intermediate points on the sides thereof, the carrier having an aperture on each side positionable to releasably coupled with the pylons to thereby selectively joint the carrier to the stroller each of the apertures being at a location distinct from the intermediate points such that the handle can be pivoted when the carrier is coupled to the pylons.

2. A child stroller and infant carrier system comprising:

a stroller having a frame with lower tubes and upper tubes;

generally parallel upstanding pylons secured to the lower tubes adjacent to their upper ends with resilient locking fingers movable outwardly from the pylon;

an infant carrier with an upstanding front, back and sides fabricated of a rigid material with pivotable handle in an inverted u-shaped configuration extending upwardly from intermediate points on the sides thereof, the carrier having an aperture on each side positionable to releasably couple with the pylons to thereby selectively join the carrier to the stroller each of the apertures being at a location distinct from the intermediate points such that the handle can be pivoted when the carrier is coupled to the pylons.

3. The device as set forth in claim 2 wherein the handle includes parallel upper tubes and a cross piece coupling the upper ends of the upper tubes, the cross piece being in a Z-shaped configuration.

* * * * *